United States Patent Office 2,940,833
Patented June 14, 1960

2,940,833

CATALYTIC HYDROGENATION OF SUBSTITUTED ANTHRAQUINONES IN THE PRODUCTION OF HYDROGEN PEROXIDE

Charles William Le Feuvre, Luton, and Cyril Alfred Morgan, Southampton, England, assignors to Laporte Chemicals Limited, Luton, England, a British company No Drawing. Filed June 28, 1954, Ser. No. 439,884

Claims priority, application Great Britain July 7, 1953

12 Claims. (Cl. 23—207)

This invention relates to improvements in catalytic reduction of alkylated or arylated anthraquinones to alkylated or arylated anthraquinhydrones or alkylated or arylated anthraquinols, and the application thereof to the manufacture of hydrogen peroxide.

It is already well-known that hydrogen peroxide can be manufactured by a process employing the autoxidation of certain organic compounds. Thus, for example, United Kingdom specification No. 465,070 describes a process for the production of hydrogen peroxide in which an alkylated anthraquinone is hydrogenated in a solvent by means of hydrogen in the presence of a catalyst, to the corresponding alkylated anthraquinol, which after separation of the catalyst, is oxidised with oxygen to produce hydrogen peroxide with regeneration of the alkylated anthraquinone. The process is thus cyclic as the alkylated anthraquinone is recycled to the hydrogenation stage after removal of the hydrogen peroxide by, for example, aqueous extraction.

Various catalysts have been proposed for use in the reduction stage, one of the most usual being activated nickel.

United Kingdom specification No. 508,081 mentions the use of active palladium as a hydrogenation catalyst in the reduction of anthraquinones to anthraquinols, but this specification does not disclose how the catalyst was prepared or used. United Kingdom specification No. 686,574 describes a process for the production of hydrogen peroxide in which an alkylated anthraquinone is hydrogenated in solution by means of hydrogen in the presence of a catalyst consisting of metallic palladium supported on activated alumina, the catalyst preferably containing 0.01% to 10% by weight of palladium and being suspended in the solution of the alkylated anthraquinone by means of a stream of hydrogen-containing gas. This specification also discloses the use of palladium catalyst on carriers of silica-alumina, coconut charcoal, active coal carbon, activated lignin carbon, decolorising vegetable carbon, granular corundum, silica gel, barium sulphate and fibrous asbestos. According to this specification none of these carriers give as good results as activated alumina.

Co-pending application Serial No. 350,519 now abandoned, describes a process for preparing a palladium catalyst for use in the reduction of anthraquinones wherein a palladium salt is absorbed from a solution on to a carrier of gamma alumina or gamma alumina monohydrate, which is then treated with a water-soluble metal hydroxide or carbonate to form a hydrated oxide or basic carbonate, which is thereafter reduced to metallic palladium.

It is an object of this invention to provide an improved catalyst for use in the hydrogenation stage of the process for the production of hydrogen peroxide by the cyclic reduction and oxidation of alkylated or arylated anthraquinones.

It has now been found according to this invention that satisfactory results in the hydrogenation of alkylated or arylated anthraquinones to alkylated or arylated anthraquinhydrones or alkylated or arylated anthraquinols, can be obtained by using as a catalyst, palladium deposited on a siliceous carrier which has been treated with an aqueous solution of an alkali.

Accordingly, the present invention provides a process for the production of alkylated or arylated anthraquinhydrones or alkylated or arylated anthraquinols from alkylated or arylated anthraquinones wherein an alkylated or arylated anthraquinone in solution in a solvent or solvent mixture is reduced by means of hydrogen in the presence of a palladium catalyst material comprising metallic palladium deposited on a siliceous carrier which has been treated with an aqueous solution of an alkali.

Preferably the siliceous carrier is silica gel but other siliceous carriers may be used, such as zeolites including artificial sodium aluminium silicates and silica-alumina catalysts which are water-insoluble silicates or mixtures containing silica. The term "silica gel" as used herein refers to a gelatinous activated form of silica.

The present invention also includes a process for the manufacture of hydrogen peroxide by the hydrogenation of an alkylated or arylated anthraquinone in a solvent or solvent mixture by means of hydrogen in the presence of a palladium catalyst material comprising metallic palladium deposited on a siliceous carrier which has been treated with a solution of an alkali, to the corresponding alkylated or arylated anthraquinhydrone or alkylated or arylated anthraquinol, which after separation of the catalyst, is oxidised by means of oxygen or oxygen-containing gas to hydrogen peroxide, with regeneration of the alkylated or arylated anthraquinone.

In order to prepare the carrier for making the catalyst, the siliceous carrier, e.g. commercial silica gel is treated with an aqueous solution of an alkali. Preferably this alkali is sodium carbonate, bicarbonate or sodium hydroxide.

United Kingdom specification No. 580,897 describes a process for the preparation of supported platinum group metal catalysts wherein a silica gel is boiled in a solution containing sodium bicarbonate with or without a wetting agent, this treated silica gel being afterwards washed and palladised in a sodium-palladium-chloride solution. It is claimed in this specification that the sodium bicarbonate not only facilitates the hydrolysis of the palladium compound, but also fills the pores of the silica gel so that the palladium oxide precipitate is concentrated on the outer surface of the gel where maximum concentration of the metal is desirable for this type of catalytic reaction in the liquid phase. The sodium bicarbonate is removed by washing the catalyst prior or subsequent to the reduction of the palladium oxide.

As stated above, the use of silica gel as a carrier for palladium catalyst for use in the reduction of anthraquinones to anthraquinols has already been disclosed in United Kingdom specification No. 686,574. The silica gel used here was, however, not treated with a solution of an alkali and the resulting palladium catalyst was found to be relatively inactive.

In the preparation of the palladium catalyst the siliceous carrier, for example silica gel, after treatment with a solution of an alkali, preferably sodium carbonate, is washed twice by decantation and then palladised with a suitable palladium compound, the preferred form being sodium chlorpalladite. The palladised support is then washed and dried and the palladium reduced to the metallic form.

It is preferable for the palladium catalyst material used in the present invention to have a particle size corresponding to a screen aperture between 0.001″ and 0.1″ and to be suspended in the solution. The use of particle sizes corresponding to a screen aperture finer than 0.001" is undesirable because the catalyst then becomes difficult to filter from the solution, while catalyst particles corresponding to a screen aperture coarser than 0.1" are difficult to suspend in the solution. By using a catalyst of the above particle size it is possible to keep the catalyst in free suspension in solution without agitation other than that provided by the gas stream, thus lengthening the active life and and reducing the danger of abrasion and disintegration.

The present invention is, of course, not restricted to the use of palladium catalyst material having a particle size corresponding to a screen aperture between 0.001" and 0.1" as it is also possible to use the catalyst material in a coarser form which can, for example, be in a fixed bed through which the working solution and the hydrogen gas are passed, either in co-current or countercurrent.

The palladium catalysts employed according to the processes of the present invention are suitable for use in free suspension in a hydrogenator and, as previously stated, the catalysts are of such particle size that separation from the solution may be substantially and simply achieved by means of filtration or a short period of settling. As previously stated the catalysts may also be of larger particle size so that they may be used in the form of a fixed bed.

The following examples illustrate the invention and the advantages thereof, Example 3 being given for comparative purposes only:

Example 1

One part by weight of commercial silica gel (100–240 mesh B.S.S.) was boiled for about 5 mins. with 0.2 part by weight of sodium carbonate dissolved in 3 parts by weight of water. It was then washed by decantation with two lots of 10 parts by weight of cold distilled water, the fine dust being thereby removed. The treated silica gel was then sucked dry at a vacuum pump and was afterwards heated to about 100° C. It was then slurried for 5 mins. with 1.5 parts by weight of boiling sodium chlorpalladite solution (containing 13 gms./l. of Pd). The palladised silica gel was then washed until neutral, with cold distilled water, sucked dry and dried in an oven at 120° C. The palladium was reduced to the metallic state with hydrogen before use.

The catalyst (2% Pd) was suspended in a hydrogenator vessel in a solution containing 100 gms./l of 2-ethyl anthraquinone in a solvent mixture containing equal volumes of benzene and methyl cyclohexanol acetate, the catalyst concentration being 10 gms./l. The rate of formation of 2-ethyl anthraquinol was 2.8 gms. per gm. of catalyst per hour expressed as the equivalent rate of formation of hydrogen peroxide.

Example 2

One part by weight of commercial silica gel (100–240 mesh B.S.S.) was boiled for about 5 mins with 0.1 part by weight of sodium hydroxide dissolved in 3 parts by weight of water. It was then washed by decantation with two lots of 10 parts by weight of cold distilled water, the fine dust being thereby removed. The treated silica gel was then sucked dry at a vacuum pump and was afterwards heated to about 100° C. It was then slurried for 5 mins. with 1.5 parts by weight of boiling sodium chlorpalladite solution (containing 13 gms./l. of Pd). The palladised silica gel was then washed until neutral, with cold distilled water, sucked dry and dried in an oven at 120° C The palladium was reduced to the metallic state with hydrogen before use.

The catalyst (2% Pd) was suspended in a hydrogenator vessel in a solution containing 100 gms./l. of 2-ethyl anthraquinone in a solvent mixture containing equal volumes of benzene and methyl cyclohexanol acetate, the catalyst concentration being 10 gms./l. The rate of formation of 2-ethyl anthraquinol was 2.8 gms. per gm. of catalyst per hour expressed as the equivalent rate of formation of hydrogen peroxide.

Example 3

An artificial sodium aluminium silicate (100–240 mesh B.S.S.) was washed by elutriation with water to remove adhering fines. The excess water was poured off and the damp artificial sodium aluminium silicate slurried for about 5 mins. with an equal weight of palladium chloride solution (containing 20 gms./l. of Pd and 10 ccs./l. of 35% HCl), the adhering mother liquor was removed by washing twice with twice the weight of water and the sample sucked dry.

The palladised carrier was then slurried for 5 mins. with sufficient sodium hydroxide solution (10 gms./l.) to give a permanent pH of about 10 and the alkali was removed by washing until neutral. The palladised support was then slurried again with the mother liquor and washings from the above, sucked dry, again treated with alkali and washed as described above. The catalyst was sucked dry and dried in an oven at 120° C. and then reduced with hydrogen before use. The catalyst containing 2% palladium when tested for activity in the same manner as described in Examples 1 and 2 above gave 1.7 gms. of hydrogen peroxide per gm. of catalyst per hour.

Example 4

The artificial sodium aluminium silicate (100–240 mesh B.S.S.) as used in Example 3 was slurried with sufficient sodium bicarbonate solution (50 gms./l.) to wet it, and then dried on a water bath until it was free-flowing. This support was treated five times with palladium chloride solution (4 gms./l. Pd + 2 ccs./l. of 35% HCl), the weight of the solution used for each treatment being approximately equal to that of the support, and the support being dried off between each treatment. The catalyst containing 2% palladium was reduced with hydrogen. When tested for activity in the same manner as described in Examples 1 and 2, the result was 3.4 gms. of hydrogen peroxide per gm. of catalyst per hour.

Example 5

One part by weight of commercial silica gel (100–240 mesh B.S.S.) was boiled for 10 mins. with 0.3 part by weight of sodium bicarbonate dissolved in 5 parts by weight of water. It was then washed by decantation with two lots of 10 parts by weight of cold distilled water. The silica gel was sucked dry and slurried for 5 min. with 1.5 parts by weight of boiling sodium chlorpalladite solution (containing 13 gms./l. of palladium). The palladised silica gel was then washed until neutral with cold distilled water, sucked dry and dried in an oven at 120° C. The palladium was reduced to the metallic state with hydrogen before use.

The catalyst (2% palladium) was suspended in a hydrogenator vessel in a solution containing 100 gms./l. of 2-tertiary butyl anthraquinone in a solvent mixture containing equal volumes of benzene and methyl cyclohexanol acetate, the catalyst concentration being 10 gms./l. The rate of formation of 2-tertiary butyl anthraquinone was determined and the result, expressed as the equivalent rate of formation of hydrogen peroxide per gm. of catalyst per hour, was 2.5 gms./gm./hour.

The activity of the catalyst employed in the process of this invention is not adversely affected by the presence of hydrogen peroxide or oxygen in the working solution, so that no special precautions are necessary for removing them before the solution comes into contact with the catalyst. Also the present catalyst has a relatively long active life and can be easily regenerated.

The catalyst employed in this invention also has the advantage that it is in a hard form and is not easily abraded during the hydrogenation reaction.

Any alkylated or arylated anthraquinone with its corresponding alkylated or arylated anthraquinhydrone or alkylated or arylated anthraquinol can be used as the organic intermediates in this process for the manufacture of hydrogen peroxide.

Examples of alkylater anthraquinones which may be used are 2-ethyl anthraquinone and 2-tertiary butyl anthraquinone.

Examples of solvents for the alkylated or arylated anthraquinhydrones or alkylated or arylated anthraquinols which may be employed are cyclohexanol acetate of propionate or methyl cyclohexanol acetate or propionate.

Examples of the other component of the solvent mixture which may be used are benzene or other liquid aromatic hydrocarbon, such as toluene or xylene.

What we claim is:

1. A process for the production of substituted anthraquinone derivatives selected from the group consisting of alkylated anthraquinhydrones, arylated anthraquinhydrones, alkylated anthraquinols and arylated anthraquinols which comprises reducing a solution of a substituted anthraquinone selected from the group consisting of alkylated anthraquinones and arylated anthraquinones in at least one solvent by treating said solution with hydrogen in the presence of a palladium catalyst material comprising metallic palladium deposited on a siliceous carrier which has been treated in the absence of reducing conditions with an aqueous solution of an alkali.

2. A process for the manufacture of hydrogen peroxide which comprises reducing a solution of a substituted anthraquinone selected from the group consisting of alkylated anthraquinones and arylated anthraquinones in at least one solvent by treating said solution with hydrogen in the presence of a palladium catalyst material comprising metallic palladium deposited on a siliceous carrier which has been treated in the absence of reducing condition with an aqueous solution of an alkali to produce a corresponding derivative selected from the group consisting of alkylated anthraquinhydrones, arylated anthraquinhydrones, alkylated anthraquinols and arylated anthraquinols, separating the catalyst and subjecting the solution to oxidation by means of an oxidising agent selected from the group consisting of oxygen and oxygen-containing gas to produce hydrogen peroxide with regeneration of the initial substituted anthraquinone.

3. A process as claimed in claim 1 wherein said alkali is a sodium compound selected from the group consisting of carbonate, bicarbonate and hydroxide.

4. A process as claimed in claim 1 wherein said alkali is a basic compound of an alkali metal.

5. A process as claimed in claim 4 wherein said catalyst material has a particle size between 0.001″ and 0.1″.

6. A process as claimed in claim 4 wherein said siliceous carrier is silica gel.

7. A process as claimed in claim 4 wherein said siliceous carrier is sodium aluminum silicate.

8. A process as claimed in claim 2 wherein said alkali is a sodium compound selected from the group consisting of carbonate, bicarbonate and hydroxide.

9. A process as claimed in claim 2 wherein said alkali is a basic compound of an alkali metal.

10. A process as claimed in claim 9 wherein said catalyst material has a particle size between 0.001″ and 0.1″.

11. A process as claimed in claim 9 wherein said siliceous carrier is silica gel.

12. A process as claimed in claim 9 wherein said siliceous carrier is sodium aluminum silicate.

References Cited in the file of this patent

UNITED STATES PATENTS

| | | |
|---|---|---|
| 1,215,396 | Mittasch et al. | Feb. 13, 1917 |
| 2,475,155 | Rosenblatt | July 5, 1949 |
| 2,657,980 | Sprauer | Nov. 3, 1953 |
| 2,668,753 | Harris et al. | Feb. 9, 1954 |
| 2,739,042 | Corey et al. | Mar. 20, 1956 |
| 2,867,507 | Gleason, Jr. et al. | Jan. 6, 1959 |

FOREIGN PATENTS

| | | |
|---|---|---|
| 580,897 | Great Britain | Sept. 24, 1946 |
| 519,509 | Belgium | May 15, 1953 |
| 161,367 | Australia | Feb. 22, 1955 |

OTHER REFERENCES

Berkman et al.: "Catalysts," 1940, pages 463–465, 508–509.